(12) United States Patent
Fecant et al.

(10) Patent No.: US 12,611,655 B2
(45) Date of Patent: *Apr. 28, 2026

(54) SELECTIVE HYDROGENATION CATALYST COMPRISING SPECIFIC CARRIER IN THE FORM OF AN ALUMINATE

(71) Applicant: IFP Energies nouvelles, Rueil-Malmaison Cedex (FR)

(72) Inventors: Antoine Fecant, Rueil-Malmaison Cedex (FR); Philibert Leflaive, Rueil-Malmaison Cedex (FR); Etienne Girard, Rueil-Malmaison Cedex (FR); Juan Jose Sossa Ledezma, Rueil-Malmaison Cedex (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 452 days.

This patent is subject to a terminal disclaimer.

(21) Appl. No.: 17/922,032

(22) PCT Filed: May 3, 2021

(86) PCT No.: PCT/EP2021/061556
§ 371 (c)(1),
(2) Date: Oct. 28, 2022

(87) PCT Pub. No.: WO2021/224173
PCT Pub. Date: Nov. 11, 2021

(65) Prior Publication Data
US 2023/0264180 A1 Aug. 24, 2023

(30) Foreign Application Priority Data
May 7, 2020 (FR) ...................................... 2004516

(51) Int. Cl.
| | |
|---|---|
| *B01J 23/883* | (2006.01) |
| *B01J 21/04* | (2006.01) |
| *B01J 23/00* | (2006.01) |
| *B01J 23/755* | (2006.01) |
| *B01J 35/30* | (2024.01) |
| *B01J 35/61* | (2024.01) |
| *B01J 37/02* | (2006.01) |
| *B01J 37/08* | (2006.01) |
| *B01J 37/20* | (2006.01) |
| *C10G 49/04* | (2006.01) |
| *C10G 65/12* | (2006.01) |

(52) U.S. Cl.
CPC ............. *B01J 23/883* (2013.01); *B01J 21/04* (2013.01); *B01J 23/005* (2013.01); *B01J 23/755* (2013.01); *B01J 35/394* (2024.01); *B01J 35/615* (2024.01); *B01J 37/0205* (2013.01); *B01J 37/0236* (2013.01); *B01J 37/024* (2013.01); *B01J 37/088* (2013.01);

*B01J 37/20* (2013.01); *C10G 49/04* (2013.01); *C10G 65/12* (2013.01); *C10G 2300/104* (2013.01); *C10G 2300/202* (2013.01); *C10G 2300/301* (2013.01); *C10G 2300/4006* (2013.01); *C10G 2300/4012* (2013.01); *C10G 2300/4018* (2013.01); *C10G 2400/02* (2013.01)

(58) Field of Classification Search
CPC .... B01J 37/0201; B01J 37/20; B01J 37/0207; B01J 37/0236; B01J 37/08; B01J 37/088; B01J 37/0205; B01J 37/024; B01J 37/14; B01J 35/394; B01J 35/635; B01J 35/396; B01J 35/397; B01J 35/615; B01J 35/633; B01J 21/04; B01J 23/755; B01J 23/883; B01J 23/005; C10G 65/12; C10G 49/04; C10G 2300/104; C10G 2300/4018; C10G 2300/301; C10G 2300/4012; C10G 2300/4006; C10G 2300/202
See application file for complete search history.

(56) References Cited

U.S. PATENT DOCUMENTS

| | | |
|---|---|---|
| 3,847,835 A | 11/1974 | Cosyns |
| 5,397,756 A | 3/1995 | Dufresne et al. |
| 5,502,269 A | 3/1996 | Sarrazin et al. |
| 5,569,806 A | 10/1996 | Cameron et al. |
| 5,958,816 A | 9/1999 | Neuman et al. |
| 6,059,956 A | 5/2000 | Dufresne |
| 6,896,795 B2 | 5/2005 | Didillon et al. |
| 2005/0014639 A1 | 1/2005 | Bhan et al. |
| 2007/0187297 A1 | 8/2007 | Bouchy et al. |

OTHER PUBLICATIONS

International Search report PCT/EP2021/061556 dated Jun. 25, 2021 (pp. 1-2).

*Primary Examiner* — Prem C Singh
*Assistant Examiner* — Brandi M Doyle
(74) *Attorney, Agent, or Firm* — Csaba Henter; MILLEN, WHITE, ZELANO & BRANIGAN

(57) ABSTRACT

A hydrotreating catalyst comprising an active phase containing at least one group VIB metal and at least one group VIII metal, and a porous support containing alumina and at least one spinel $MAl_2O_4$ where M is chosen from nickel and cobalt, characterized in that:
- the molar ratio (r1) between said group VIII metal and said group VIB metal of the active phase is between 1.0 and 3.0 mol/mol;
- the molar ratio (r2) between said metal M of the porous support and said group VIII metal of the active phase is between 0.3 and 0.7 mol/mol;
- the molar ratio (r3) between the sum of the contents of the metal M and of the group VIII metal relative to the content of group VIB metal is between 2.2 and 3.0 mol/mol.

17 Claims, No Drawings

SELECTIVE HYDROGENATION CATALYST COMPRISING SPECIFIC CARRIER IN THE FORM OF AN ALUMINATE

FIELD OF THE INVENTION

The present invention relates to a catalyst for the selective hydrogenation of a gasoline and for increasing the molecular weight of light mercaptans, and to a process making it possible to jointly carry out the selective hydrogenation of polyunsaturated compounds into monounsaturated compounds contained in gasolines, and also increase the molecular weight of light sulfur compounds by reaction with unsaturated compounds.

PRIOR ART

The production of gasolines meeting the new environmental standards requires their sulfur content to be significantly reduced to values generally not exceeding 50 ppm, and preferentially less than 10 ppm.

It is furthermore known that conversion gasolines, and more particularly those originating from catalytic cracking, which can represent from 30% to 50% of the gasoline pool, have high contents of mono-olefins and of sulfur.

The sulfur present in gasolines is for this reason attributable, to close to 90%, to the gasolines resulting from catalytic cracking processes, which will subsequently be called FCC (Fluid Catalytic Cracking) gasoline. FCC gasolines thus constitute the preferred feedstock for the process of the present invention. More generally, the process according to the invention is applicable to any gasoline cut containing a certain proportion of diolefins, and which may also contain some lighter compounds belonging to the C3 and C4 cuts.

The gasolines from cracking units are generally rich in olefins and sulfur, but also in diolefins, the content of which, for gasolines from catalytic cracking, can range up to 5% by weight. Diolefins are unstable compounds which can easily polymerize and must generally be removed before any treatment of these gasolines, such as hydrodesulfurization treatments intended to meet the specifications on the sulfur content in gasolines. However, this hydrogenation must be selective with respect to the diolefins and must limit the hydrogenation of olefins in order to limit the hydrogen consumption and also the loss of octane from the gasoline. Furthermore, as has been described in patent application EP01077247 A1, it is advantageous to convert the mercaptans by increasing the molecular weight before the desulfurization step because this makes it possible to produce a desulfurized gasoline fraction composed mainly of olefins with carbon atoms without loss of octane, by simple distillation. The amount of sulfur present in the feedstock after the selective hydrogenation and the increasing of the molecular weight of the light sulfur compounds is not modified; only the nature of the sulfur is modified by the increasing of the molecular weight of the mercaptans.

In addition, the diene compounds present in the feedstock to be treated are unstable and have a tendency to form gums by polymerization. This gum formation leads to gradual deactivation of the hydrodesulfurization catalyst located downstream or gradual clogging of the reactor. For an industrial application, it is therefore important to use catalysts which limit the formation of polymers, i.e. catalysts with low acidity or the porosity of which is optimized to facilitate the continuous extraction of the polymers or precursors of gums by the hydrocarbons in the feedstock, in order to ensure maximum cycle time for the catalyst.

Patent FR 2118309 by the applicant proposes a method for preparing a catalyst on a support comprising at least one group VIB metal and at least one metal from group VIII, deposited on a specific support comprising a metal aluminate of the type $MAl_2O_4$ with a metal M chosen from nickel and cobalt.

Patent US2005/014639 proposes a method for preparing a catalyst on a support comprising at least one group VIB metal and at least one non-noble metal from group VIII, deposited sequentially on a specific support comprising a metal aluminate of the type $MAl_2O_4$ with a metal M chosen from group VIII metals.

Patent FR 2895415 by the applicant proposes a method for selective hydrogenation using a catalyst with a specific support. The process uses a catalyst on a support comprising at least one group VIB metal and at least one non-noble metal from group VIII used in the sulfided form, deposited on a specific support comprising a metal aluminate of the $MAl_2O_4$ type with a metal M chosen from nickel and cobalt.

Patent FR 2935389 by the applicant proposes a method for selective hydrogenation using a sulfur-containing catalyst of specific composition. The catalyst comprises at least one group VIB metal and at least one group VIII metal supported on alumina, wherein the content of group VIB metal oxide is between 4% and 20% by weight relative to the total weight of the catalyst, the content of group VIII metal oxide is less than 15% by weight relative to the total weight of the catalyst, the molar ratio of the group VIII metal to the group VIB metal being between 0.6 and 3.0 mol/mol, said catalyst comprising a total pore volume of between 0.4 and 1.4 $cm^3/g$.

In light of the solutions described in the literature, the present invention proposes a new catalyst having a specific support, making it possible to jointly carry out the selective hydrogenation of polyunsaturated compounds and more particularly diolefins, and also increase the molecular weight of light sulfur compounds and more particularly mercaptans.

Subjects of the Invention

The present invention relates to a hydrotreating catalyst comprising an active phase containing at least one group VIB metal and at least one group VIII metal, and a porous support containing alumina and at least one spinel $MAl_2O_4$ where M is chosen from nickel and cobalt, characterized in that:

the molar ratio (r1) between said group VIII metal of the active phase and said group VIB metal of the active phase is between 1.0 and 3.0 mol/mol;

the molar ratio (r2) between said metal M of the porous support and said group VIII metal of the active phase is between 0.3 and 0.7 mol/mol;

the molar ratio (r3) between the sum of the contents of the metal M and of the group VIII metal of the active phase relative to the content of group VIB metal of the active phase is between 2.2 and 3.0 mol/mol.

The applicant has in fact surprisingly discovered that a catalyst based on at least one group VIII metal and one group VIB metal, deposited on a specific support containing at least partly a nickel aluminate or a cobalt aluminate, and having specific ratios between these different metals, has, via a synergistic effect, a better activity and a better selectivity in terms of diolefin hydrogenation, while at the same time allowing a conversion of the light sulfur compounds that is at least as good, or even better, compared to the catalysts disclosed in the prior art.

Without wishing to be bound by any theory, an optimization of the content of metal M aluminate relative to the content of group VIB metal would allow a better dispersion of the active phase, producing an improvement in catalytic performances. The presence of aluminate in a given amount also makes it possible to limit or prevent migration of the group VIII metal within the porous support containing alumina, during the phase of activation of the catalyst prior to sulfurization and thus to preserve a ratio between the group VIII metal and the group VIB metal which is optimal at the surface of the catalyst.

Advantageously, the molar ratio (r4) between said metal M of the porous support and said group VIB metal of the active phase is between 0.5 and 1.5 mol/mol.

Advantageously, the molar ratio (r4) is between 0.7 and 1.5 mol/mol.

Advantageously, the content of group VIII metal of the active phase, measured in oxide form, is between 1 and 20% by weight relative to the total weight of the catalyst.

Advantageously, the content of group VIB metal of the active phase, measured in oxide form, is between 1 and 12% by weight relative to the total weight of the catalyst.

Advantageously, the content of metal M, measured in oxide form, is between 0.5 and 10% by weight relative to the total weight of the catalyst.

Advantageously, the specific surface area of the catalyst is between 110 and 190 m²/g.

Advantageously, the degree of sulfidation of the metals of the active phase is at least equal to 50%.

Preferably, the molar ratio (r3) is between 2.3 and 3.0 mol/mol.

Preferably, the group VIII metal is nickel and the group VIB metal is molybdenum.

Preferably, the metal M is nickel.

Another subject according to the invention relates to a process for preparing a catalyst according to the invention, comprising the following steps:

a) the support is brought into contact with an aqueous or organic solution comprising at least one salt of metal M chosen from nickel and cobalt;

b) the support impregnated on conclusion of step a) is left to mature at a temperature of less than 50° C. for a period of between 0.5 hour and 24 hours;

c) the matured impregnated support obtained on conclusion of step b) is dried at a temperature of between 50° C. and 200° C.;

d) the solid obtained in step c) is calcined at a temperature of between 500° C. and 1000° C. so as to obtain a spinel of type $MAl_2O_4$;

e) the following substeps are carried out:

i) the solid obtained on conclusion of step d) is brought into contact with a solution comprising at least one precursor of the active phase of metal based on a group VIII metal and then the catalyst precursor is left to mature at a temperature of less than 50° C., preferably at ambient temperature, for a period of between 0.5 hour and 12 hours, preferably between 0.5 hour and 6 hours, and more preferentially still between 0.5 and 3 hours;

ii) the solid obtained on conclusion of step d) is brought into contact with a solution comprising at least one precursor of the active phase of metal based on a group VIB metal and then the catalyst precursor is left to mature at a temperature of less than 50° C., preferably at ambient temperature, for a period of between 0.5 hour and 12 hours, preferably between 0.5 hour and 6 hours, and more preferentially still between 0.5 and 3 hours;

steps i) and ii) being carried out separately, in any order, or at the same time;

f) the catalyst precursor obtained in step e) is dried at a temperature of between 50° C. and 200° C., preferably between 70 and 180° C., for a period typically of between 0.5 and 12 hours, and even more preferably for a period of 0.5 to 5 hours.

In one embodiment according to the invention, the process also comprises a step g) wherein the catalyst precursor obtained in step f) is calcined at a temperature of between 200° C. and 550° C. for a period advantageously of between 0.5 and 24 hours.

Another subject according to the invention relates to a process for the selective hydrogenation of a gasoline comprising polyunsaturated compounds and light sulfur compounds, wherein the gasoline and hydrogen are brought into contact with a catalyst according to the invention, or obtained according to the preparation process according to the invention, in sulfide form, at a temperature of between 80° C. and 220° C., with a liquid space velocity of between 1 h⁻¹ and 10 h⁻¹ and a pressure of between 0.5 and 5 MPa, and with a molar ratio between hydrogen and the diolefins to be hydrogenated of greater than 1 and less than 10 mol/mol.

Preferably, said gasoline is fluid catalytic cracking (FCC) gasoline and has a boiling point of between 0° C. and 280° C.

Another subject according to the invention relates to a process for the desulfurization of gasoline comprising sulfur compounds, comprising the following steps:

a) a step of selective hydrogenation implementing a process for the selective hydrogenation of a gasoline comprising polyunsaturated compounds and light sulfur compounds according to the invention;

b) a step of separation of the gasoline obtained in step a) into at least two fractions comprising, respectively, at least one light gasoline and one heavy gasoline;

c) a step of hydrodesulfurization of the heavy gasoline separated in step b) on a catalyst making it possible to at least partially decompose the sulfur compounds into $H_2S$.

DETAILED DESCRIPTION OF THE INVENTION

Definitions

In the text hereinbelow, the groups of chemical elements are given according to the CAS classification (CRC Handbook of Chemistry and Physics, published by CRC Press, editor-in-chief D. R. Lide, 81ˢᵗ edition, 2000-2001). For example, group VIII according to the CAS classification corresponds to the metals of columns 8, 9 and 10 according to the new IUPAC classification.

The term "specific surface area" is understood to mean the BET specific surface area ($S_{BET}$ in m²/g) determined by nitrogen adsorption in accordance with Standard ASTM D 3663-78 established from the Brunauer-Emmett-Teller method described in the journal "The Journal of the American Chemical Society", 1938, 60, 309.

Total pore volume of the catalyst or of the support used for the preparation of the catalyst is understood to mean the volume measured by mercury porosimetry intrusion according to Standard ASTM D4284-83 at a maximum pressure of 4000 bar (400 MPa), using a surface tension of 484 dynes/cm and a contact angle of 140°. The wetting angle was taken equal to 140° following the recommendations of the publication "Techniques de l'ingénieur, traité analyse et caractérisation" [Techniques of the Engineer, Analysis and Characterization Treatise], pages 1050-1055, written by Jean Charpin and Bernard Rasneur. In order to obtain better accuracy, the value of the total pore volume corresponds to the value of the total pore volume measured by mercury intrusion porosimetry measured on the sample minus the value of the total pore volume measured by mercury intrusion porosimetry measured on the same sample for a pressure corresponding to 30 psi (approximately 0.2 MPa).

The contents of metals from group VIII and group VIB are measured by X-ray fluorescence.

Catalyst

The catalyst according to the invention comprises, preferably consists of, an active phase containing, preferably consisting of, at least one group VIB metal and at least one group VIII metal, and a porous support containing alumina and at least one spinel $MAl_2O_4$ where M is chosen from nickel and cobalt, characterized in that:

the molar ratio (r1) between said group VIII metal of the active phase and said group VIB metal of the active phase is between 1.0 and 3.0 mol/mol, preferably between 1.5 and 3.0 mol/mol, more preferentially between 1.6 and 3.0 mol/mol;

the molar ratio (r2) between said metal M of the porous support and said group VIII metal of the active phase is between 0.3 and 0.7 mol/mol, more preferentially between 0.5 and 0.7 mol/mol;

the molar ratio (r3) between the sum of the contents of the metal M and of the group VIII metal of the active phase relative to the content of group VIB metal of the active phase is between 2.2 and 3.0 mol/mol, preferably between 2.3 and 3.0 mol/mol, more preferentially between 2.5 and 3.0 mol/mol.

When the group VIII metal of the active phase used is nickel or cobalt, the calculated molar ratio does not take into account the nickel or the cobalt involved in the spinel.

The content of group VII metal of the active phase, measured in oxide form, is between 1 and 20% by weight relative to the total weight of the catalyst, preferably between 2 and 15% by weight, and even more preferentially between 4 and 13% by weight. The group VIII metal is preferably chosen from nickel, cobalt and iron. More preferably, the group VIII metal is nickel.

The content of group VIB metal of the active phase, measured in oxide form, is advantageously between 1 and 12% by weight relative to the total weight of the catalyst, preferably between 1 and 10% by weight, and even more preferentially between 2 and 9% by weight. The group VIB metal is preferably chosen from molybdenum and tungsten. More preferably, the group VIB metal is molybdenum.

Preferably, the catalyst according to the invention also comprises a molar ratio (r4) between said metal M of the porous support and said group VIB metal of the active phase of between 0.5 and 1.5 mol/mol, preferably between 0.7 and 1.5 mol/mol, and more preferentially still between 0.8 and 1.5 mol/mol. Without wishing to be bound by any theory, an optimization of the content of metal M aluminate relative to the content of group VIB metal would allow a better dispersion of the active phase, producing an improvement in catalytic performances.

Preferably, a catalyst having a total pore volume, measured by mercury porosimetry, of between 0.3 and 1.1 cm³/g and very preferably between 0.35 and 0.7 cm³/g is used. The

6 mercury porosimetry is measured according to Standard ASTM D4284-92 with a wetting angle of 140°, with an Autopore III model device from the Micromeritics® brand.

The specific surface area of the catalyst is preferably less than 350 m²/g, and more preferably of between 80 m²/g and 280 m²/g, preferably between 100 m²/g and 250 m²/g, and even more preferentially between 110 m²/g and 190 m²/g.

In addition, the volume of the pores of the catalyst, the diameter of which is greater than 0.05 μm, measured by mercury porosimetry, is preferably between 5 and 50% of the total pore volume and preferably between 10 and 40% of the total pore volume.

The volume of the pores of the catalyst, the diameter of which is greater than 0.1 μm, is preferably between 5 and 35% of the total pore volume and more preferably between 10% and 30% of the total pore volume. It has notably been observed by the inventors that this pore distribution makes it possible to limit the formation of gums in the catalyst.

Support

The support of the catalyst comprises, preferably consists of, an alumina and an aluminate of metal M of $MAl_2O_4$ type with M selected from the group consisting of nickel and cobalt, preferably M is nickel.

Advantageously, the content of metal M, measured in oxide form, is between 0.5 and 10% by weight relative to the total weight of the catalyst, preferably between 0.7 and 8% by weight, and even more preferentially between 1 and 5% by weight.

The presence of spinel in the catalyst according to the invention is measured by temperature-programmed reduction (or TPR) such as for example described in Oil & Gas Science and Technology, Rev. IFP, Vol. 64 (2009), No. 1, pp. 11-12. According to this technique, the catalyst is heated in a stream of a reducing agent, for example in a stream of dihydrogen. The measurement of the dihydrogen consumed as a function of the temperature gives quantitative information regarding the reducibility of the species present. The presence of spinel in the catalyst is thus expressed by a consumption of dihydrogen at a temperature above around 800° C.

The alumina used is chosen from the following aluminas: gamma-, delta-, theta-, eta-, rho-, chi-, kappa-aluminas, taken alone or as a mixture.

Preferably, a support having a total pore volume, measured by mercury porosimetry, of between 0.3 and 1.1 cm³/g and preferentially between 0.35 and 0.7 cm³/g is used.

In addition, the volume of the pores of the support, measured by mercury porosimetry, the diameter of which is greater than 0.05 μm, is preferably between 5 and 50% of the total pore volume and more preferably between 10 and 40% of the total pore volume.

The volume of the pores of the support, the diameter of which is greater than 0.1 μm, is preferably between 5 and 35% of the total pore volume and more preferably between 5 and 30% of the total pore volume.

The specific surface area of the support is preferably less than 350 m²/g, and more preferably between 80 m²/g and 280 m²/g, preferably between 100 m²/g and 250 m²/g, and even more preferentially between 120 m²/g and 190 m²/g.

Synthesis of the Support Comprising an Aluminate

The precursor of the support that can be used in the context of the invention comprises alumina. Said precursor of the support can also consist of a mixture of alumina and of any other oxide known to those skilled in the art other than the aluminates, such as for example silica, titanium oxide, magnesium oxide, zinc oxide, zirconium oxide. The alumina used is selected from the group of aluminas which make it possible to incorporate a metal M chosen from nickel and cobalt, preferably nickel. Preferably, the alumina is chosen from the gamma-, delta-, theta-, eta-, rho-, chi-, kappa-aluminas, taken alone or as a mixture.

Dry impregnation of an alumina as mentioned above is advantageously carried out with an aqueous solution containing an appropriate amount of metal nitrate such as nickel nitrate or cobalt nitrate. The amount of metal nitrate corresponds to a metal content (in oxide equivalent, MO with M selected from the group consisting of nickel and cobalt) of 0.5 to 10% by weight relative to the total weight of the catalyst, preferably of between 0.7 to 8% by weight and even more preferably of between 1 to 5% by weight on the solid.

After impregnation, the solid is left to mature at a temperature of less than 50° C., preferably at ambient temperature, for 0.5 to 24 hours, preferably between 0.5 and 12 hours, then dried at a temperature advantageously of between 50° C. and 200° C., preferably between 70 and 180° C., for a period advantageously of between 1 and 48 hours, preferably between 2 and 12 hours. Finally, the solid is calcined under a stream of dry air or under a stream of moist air, preferably under a stream of moist air, at a temperature of between 500 and 1100° C., preferably between 600 and 900° C., for a period advantageously between 1 and 12 hours, preferably between 2 and 8 hours. This calcination makes it possible to form the spinel $MAl_2O_4$ where M is chosen from nickel and cobalt. The solid obtained is subsequently denoted by the term AlNi or AlCo.

Preparation of the Catalyst

The catalyst according to the invention can be prepared by means of any technique known to those skilled in the art, and notably by impregnation of the group VIII and VIB elements on the selected support. The impregnation can, for example, be carried out according to the method known to those skilled in the art under the terminology of dry impregnation, wherein just the amount of desired elements in the form of soluble salts is introduced into the chosen solvent, for example demineralized water, so as to fill as exactly as possible the porosity of the support. The precursor of the active phase based on a group VIII metal and the precursor of the active phase of the group VIB metal can be introduced simultaneously or successively. The impregnation of each precursor can advantageously be carried out at least twice. The different precursors can thus advantageously be impregnated successively with a different impregnation and maturation time. One of the precursors can also be impregnated several times.

The support thus filled with the solution is left to mature at a temperature below 50° C., preferably at ambient temperature, for a period of between 0.5 hour and 12 hours, preferably between 0.5 hour and 6 hours, and even more preferentially between 0.5 and 3 hours. Following the maturation step, the catalyst precursor obtained undergoes an activation treatment.

The aim of this treatment is generally to transform the molecular precursors of the elements into the oxide phase. It is in this case an oxidizing treatment but a simple drying of the catalyst can also be carried out.

In the case of drying, the catalyst precursor is dried at a temperature of between 50° C. and 200° C., preferably between 70° C. and 180° C., for a period typically of between 0.5 and 12 hours, and even more preferably for a period from 0.5 to 5 hours.

In the case of an oxidizing treatment, also referred to as calcination, said treatment is generally carried out under dry or moist air or under dilute oxygen, and the treatment temperature is generally between 200° C. and 550° C., preferably between 300° C. and 500° C. and more preferentially between 325° C. and 475° C., and advantageously for a period typically of between 0.5 and 24 hours, preferably for a period from 0.5 to 12 hours, and even more preferably for a period from 0.5 to 10 hours. Salts of group VIB and VIII metals that can be used in the process for preparing the catalyst are, for example, cobalt nitrate, nickel nitrate, ammonium heptamolybdate or ammonium metatungstate. Any other salt known to those skilled in the art which has a sufficient solubility and can be decomposed during the activation treatment can also be used. Advantageously, the drying and the oxidizing treatment are both carried out during the process for preparing the catalyst.

Preferably, the catalyst according to the invention is prepared according to the following steps:

a) the support is brought into contact with an aqueous or organic solution comprising at least one salt of metal M chosen from nickel and cobalt;

b) the support impregnated on conclusion of step a) is left to mature at a temperature of less than 50° C., preferably at ambient temperature, for a period of between 0.5 hour and 24 hours, preferably between 0.5 hour and 12 hours;

c) the matured impregnated support obtained on conclusion of step b) is dried at a temperature of between 50° C. and 200° C., preferably between 70 and 180° C., for a period advantageously of between 1 and 48 hours, preferably between 2 and 12 hours;

d) the solid obtained in step c) is calcined at a temperature of between 500° C. and 1000° C., preferably between 600 and 900° C., for a period advantageously of between 1 and 12 hours, preferably between 2 and 12 hours, so as to obtain a spinel of $MAl_2O_4$ type;

e) the following substeps are carried out:

i) the solid obtained on conclusion of step d) is brought into contact with a solution comprising at least one precursor of the active phase of metal based on a group VIII metal and then the catalyst precursor is left to mature at a temperature of less than 50° C., preferably at ambient temperature, for a period of between 0.5 hour and 12 hours, preferably between 0.5 hour and 6 hours, and even more preferentially between 0.5 and 3 hours;

ii) the solid obtained on conclusion of step d) is brought into contact with a solution comprising at least one precursor of the active phase of metal based on a group VIII metal and then the catalyst precursor is left to mature at a temperature of less than 50° C., preferably at ambient temperature, for a period of between 0.5 hour and 12 hours, preferably between 0.5 hour and 6 hours, and even more preferentially between 0.5 and 3 hours;

steps i) and ii) being carried out separately, in any order, or at the same time;

f) the catalyst precursor obtained in step e) is dried at a temperature of between 50° C. and 200° C., preferably between 70 and 180° C., for a period typically of between 0.5 and 12 hours, and even more preferably for a period of 0.5 to 5 hours;

g) optionally, the catalyst precursor obtained in step f) is calcined at a temperature of between 200° C. and 550° C., preferably between 300 and 500° C., and more preferentially between 325° C. and 475° C., for a period advantageously between 0.5 and 24 hours, preferably for a period of 0.5 to 12 hours, and even more preferably for a period of 0.5 to 10 hours.

Step 3: Sulfidation of the Catalyst

Before being brought into contact with the feedstock to be treated, the catalysts undergo a sulfidation step. The sulfidation is carried out in a sulfur-reducing medium, i.e. in the presence of $H_2S$ and hydrogen, in order to transform metal oxides into sulfides such as, for example, $MoS_2$ and NiS. The sulfidation is carried out by injecting, onto the catalyst, a stream containing $H_2S$ and hydrogen, or else a sulfur compound capable of decomposing to give $H_2S$ in the presence of the catalyst and of hydrogen. Polysulfides, such as dimethyl disulfide, are $H_2S$ precursors commonly used to sulfide catalysts. The temperature is adjusted in order for the $H_2S$ to react with the metal oxides or the dried (non-calcined) catalysts to form metal sulfides. This sulfidation can be carried out in situ or ex situ (inside or outside the reactor) of the hydrotreating reactor at temperatures of between 200 and 600° C. and more preferentially between 250 and 500° C. To be active, the metals must be substantially sulfided. A metal is regarded as substantially sulfided when the molar ratio of the sulfur (S) present on the catalyst to said element is at least equal to 50% of the theoretical molar ratio corresponding to the complete sulfidation of the element under consideration. The overall degree of sulfidation is defined by the following equation:

$$(S/element)_{catalyst} >= 0.5 \times (S/element)_{theoretical}$$

with:

$(S/element)_{catalyst}$ molar ratio between sulfur (S) and the element present on the catalyst, excluding the metal (Ni or Co) present in the form of an aluminate.

$(S/element)_{theoretical}$ molar ratio between sulfur and the element corresponding to the total sulfidation of the element to give sulfide.

This theoretical molar ratio varies according to the element under consideration:

$(S/Fe)_{theoretical} = 1$
$(S/Co)_{theoretical} = 8/9$
$(S/Ni)_{theoretical} = 1/1$ $(S/Mo)_{theoretical} = 2/1$
$(S/W)_{theoretical} = 2/1$ Since the catalyst comprises several metals, the molar ratio of S present on the catalyst to the combined elements also has to be at least equal to 50% of the theoretical molar ratio corresponding to the complete sulfidation of each element to give sulfide, the calculation being carried out in proportion to the relative molar fractions of each element, excluding the metal (Ni or Co) involved during the preparation of the support.

For example, for a catalyst comprising molybdenum and nickel with a respective molar fraction of 0.7 and 0.3, the minimum molar ratio (S/Mo+Ni) is given by the following relationship:

$$(S/Mo+Ni)_{catalyst} = 0.5 \times [(0.7 \times 2) + (0.3 \times 1)]$$

Very preferably, the degree of sulfidation of the metals will be greater than 70%.

The sulfidation is carried out on the metals in oxide form without a prior metal reduction step being carried out. Indeed, it is known that the sulfidation of reduced metals is more difficult than the sulfidation of metals in the oxide form.

Selective Hydrogenation Process

The invention also relates to a process for treating a gasoline comprising any type of chemical family and notably diolefins, mono-olefins, and sulfur compounds in the form of mercaptans and light sulfides. The present invention finds particular application in the transformation of conversion gasolines, and in particular gasolines originating from catalytic cracking, from fluid catalytic cracking (FCC), from a coking process, from a visbreaking process, or from a pyrolysis process. The feedstocks to which the invention applies have a boiling point of between 0° C. and 280° C. The feedstocks can also contain hydrocarbons with 3 or 4 carbon atoms.

For example, the gasolines resulting from catalytic cracking (FCC) units contain, on average, between 0.5% and 5% by weight of diolefins, between 20% and 50% by weight of mono-olefins and between 10 ppm and 0.5% by weight of sulfur, generally including less than 300 ppm of mercaptans. The mercaptans are generally concentrated in the light fractions of the gasoline and more specifically in the fraction, the boiling point of which is less than 120° C.

The gasoline treatment described in the present selective hydrogenation process mainly consists in:

selectively hydrogenating the diolefins to mono-olefins;
transforming the saturated light sulfur compounds and mainly mercaptans into heavier sulfides or mercaptans by reaction with the mono-olefins;
isomerizing the mono-olefin compounds having their C=C double bond in the external position into their isomer having their C=C double bond in the internal position.

The reactions for hydrogenation of diolefins into mono-olefins are illustrated below by the transformation of 1,3-pentadiene, an unstable compound, which can easily be hydrogenated into 2-pentene. However, it is sought to limit the side reactions of mono-olefin hydrogenation which, in the example below, would lead to the formation of n-pentane and therefore to a drop in the octane number.

The sulfur compounds which it is sought to transform are mainly mercaptans. The main reaction to transform mercaptans consists of a thioetherification reaction between the mono-olefins and the mercaptans. This reaction is illustrated below by the addition of propane-2-thiol to 2-pentene to form a propylpentyl sulfide.

In the presence of hydrogen, the transformation of the sulfur compounds can also go through the intermediate formation of $H_2S$ which can then be added to the unsaturated compounds present in the feedstock. However, this route is in the minority under the preferred reaction conditions.

In addition to mercaptans, the compounds likely to be transformed and made heavier in this way are sulfides and mainly $CS_2$, COS, thiophane and methylthiophane.

In some cases, it is possible to observe reactions in which the molecular weight of light nitrogenous compounds, and mainly nitriles, pyrrole and its derivatives, is increased.

According to the invention, the catalyst also makes it possible to carry out an isomerization of the mono-olefinic compounds having their C=C double bond in the external position into their isomer having their C=C double bond in the internal position.

This reaction is illustrated below by the isomerization of 1-hexene to 2-hexene or 3-hexene:

In the selective hydrogenation process according to the invention, the feedstock to be treated is mixed with hydrogen before being brought into contact with the catalyst. The amount of hydrogen injected is such that the molar ratio between the hydrogen and the diolefins to be hydrogenated is greater than 1 (stoichiometry) and less than 10, and preferably between 1 and 5 mol/mol. Too much excess hydrogen can lead to strong hydrogenation of mono-olefins and consequently a decrease in the octane number of the gasoline. All of the feedstock is generally injected at the inlet of the reactor when the process is carried out in a fixed bed. However, it may be advantageous, in certain cases, to inject a fraction or all of the feedstock between two consecutive catalytic beds placed in the reactor. This embodiment makes it possible notably to continue to operate the reactor if the inlet of the reactor is clogged by deposits of polymers, particles, or gums present in the feedstock.

The mixture consisting of gasoline and hydrogen is brought into contact with the catalyst at a temperature of between 80° C. and 220° C., and preferably between 90° C. and 200° C., with a liquid hourly space velocity (LHSV) of between 1 $h^{-1}$ and 10 $h^{-1}$, the liquid hourly space velocity being the liter of feedstock per liter of catalyst and per hour (l/l·h). The pressure is adjusted so that the reaction mixture is mainly in liquid form in the reactor. The pressure is between 0.5 MPa and 5 MPa and preferably between 1 and 4 MPa.

The gasoline treated under the conditions stated above has a reduced content of diolefins and mercaptans. Generally, the gasoline produced contains less than 1% by weight of diolefins, and preferably less than 0.5% by weight of diolefins. The light sulfur compounds of which the boiling point is lower than that of thiophene (84° C.) are generally more than 50% converted. It is therefore possible to separate the light fraction from the gasoline by distillation and to send this fraction directly to the gasoline pool without additional treatment. The light fraction of gasoline generally has a final point below 120° C., and preferably below 100° C. and most preferably below 80° C.

The selective hydrogenation process according to the invention is particularly suitable for being implemented in the context of the desulfurization process described in patent application EP 1 077 247.

A subject of the present invention is also a process for the desulfurization of gasoline comprising sulfur compounds, comprising at least the following steps:

a) a selective hydrogenation step implementing the process described above;

b) a step of separation of the gasoline obtained in step a) into at least two fractions comprising, respectively, at least one light gasoline and one heavy gasoline;

c) a step of hydrodesulfurization of the heavy gasoline separated in step b) on a catalyst making it possible to at least partially decompose the sulfur compounds into $H_2S$.

Separation step b) is preferably carried out by means of a conventional distillation column, also called a splitter. This fractionation column must make it possible to separate a light fraction of the gasoline containing a small fraction of the sulfur and a heavy fraction preferably containing the majority of the sulfur initially present in the initial gasoline.

This column generally operates at a pressure of between 0.1 and 2 MPa, preferably between 0.2 and 1 MPa. The number of theoretical plates of this separation column is generally between and 100 and preferably between 20 and 60. The reflux ratio, expressed as being the ratio of the liquid flow rate in the column divided by the distillate flow rate expressed in kg/h, is generally less than unity and preferably less than 0.8.

The light gasoline obtained on conclusion of the separation generally contains at least all of the C5 olefins, preferably the C5 compounds and at least 20% of the C6 olefins. Generally, this light fraction has a low sulfur content, that is to say that it is generally not necessary to treat the light cut before using it as fuel.

Desulfurization step c) is preferably a hydrodesulfurization step carried out by passing heavy gasoline, in the presence of hydrogen, over a hydrodesulfurization catalyst comprising at least one group VIII element and/or at least one group VIB element at least partly in sulfide form, at a temperature of between about 210° C. and about 350° C., preferably between 220° C. and 320° C., under a pressure generally of between about 1 and about 4 MPa, preferably between 1.5 and 3 MPa. The hourly space velocity of the liquid is between about 1 and about 20 $h^{-1}$ (expressed in volume of liquid per volume of catalyst and per hour), preferably between 1 and 10 $h^{-1}$, very preferably between 3 and 8 $h^{-1}$. The $H_2$/feedstock ratio is between 100 and 600 Nl/l and preferentially between 300 and 600 Nl/l.

The content of group VIII metal, expressed as oxide, is generally between 0.5 and 15% by weight and preferentially between 1 and 10% by weight, relative to the weight of the hydrodesulfurization catalyst. The content of group VIB metal, expressed as oxide, is generally between 1.5 and 60% by weight and preferentially between 3 and 50% by weight, relative to the weight of hydrodesulfurization catalyst.

The group VIII element, when present, is preferably cobalt, and the group VIB element, when present, is generally molybdenum or tungsten. Combinations such as cobalt-molybdenum are preferred. The support of the hydrodesulfurization catalyst is usually a porous solid such as, for example, an alumina, a silica-alumina, or other porous solids such as, for example, magnesia, silica or titanium oxide, alone or as a mixture with alumina or silica-alumina. To minimize the hydrogenation of the olefins present in the heavy gasoline, it is advantageous to preferentially use a catalyst wherein the density of molybdenum, expressed in % by weight of $MoO_3$ (the % by weight being expressed relative to the total weight of the catalyst) per unit of specific surface area, is greater than 0.07 and preferably greater than 0.12. The hydrodesulfurization catalyst according to step c) preferably has a specific surface area of less than 250 $m^2/g$, more preferably less than 230 $m^2/g$, and very preferably less than 190 $m^2/g$, and more preferentially between 100 and 180 $m^2/g$.

The deposition of the metals on the support is obtained by any method known to those skilled in the art, such as, for example, dry impregnation, by excess of a solution containing the metal precursors. The impregnation solution is chosen so as to be able to dissolve the metal precursors in the desired concentrations. For example, in the case of the synthesis of a CoMo catalyst, the molybdenum precursor can be molybdenum oxide, ammonium heptamolybdate, while the cobalt precursor can be for example cobalt nitrate, cobalt hydroxide, cobalt carbonate. The precursors are generally dissolved in a medium allowing their solubilization in the desired concentrations.

After introduction of the element(s) and optionally shaping of the catalyst, the catalyst is activated in a first step. This activation can correspond either to oxidation and then to reduction, or to direct reduction, or to calcining only. The calcining step is generally carried out at temperatures ranging from about 100 to about 600° C. and preferably of between 200 and 450° C., under a flow of air. The reduction step is carried out under conditions making it possible to convert at least a part of the oxidized forms of the base metal into metal. Generally, it consists in treating the catalyst under a stream of hydrogen at a temperature preferably at least equal to 300° C. The reduction can also be partly carried out by means of chemical reducing agents.

The catalyst is preferably used at least partly in its sulfided form. The introduction of the sulfur can take place before or after any activation step, that is to say calcining or reduction step. The sulfur or a sulfur compound can be introduced ex situ, that is to say outside the reactor where the process according to the invention is carried out, or in situ, that is to say in the reactor used for the process according to the invention. In the first case, the ex-situ sulfidation is characterized by a final passivation step. Indeed, the sulfide phases have a very high reactivity with respect to ambient air (self-heating nature due to oxidation) prohibiting their subsequent handling without additional treatment aimed at limiting this reactivity. Among the commercial ex situ sulfidation procedures, mention is made of the Totsucat® process from Eurecat (EP 0 564 317 B1 and EP 0 707 890 B1) and the XpresS® process from Tricat (U.S. Pat. No. 5,958,816). In the second case (in-situ sulfidation), the catalyst is preferably reduced under the conditions described above, then sulfided by passing a feedstock containing at least one sulfur compound, which, once decomposed, leads to fixing of sulfur on the catalyst. This feedstock may be gaseous or liquid, for example hydrogen containing $H_2S$, or a liquid containing at least one sulfur compound.

Preferably, the sulfur compound is added to the catalyst ex situ. For example, after the calcining step, a sulfur compound can be introduced onto the catalyst, optionally in the presence of another compound. The catalyst is subsequently dried, and then transferred into the reactor serving to perform the process according to the invention. In this reactor, the catalyst is then treated under hydrogen so as to transform at least part of the main metal into sulfide. A procedure that is particularly suitable for use in the invention is the one described in patents FR-B-2 708 596 and FR-B-2 708 597.

EXAMPLES

The invention is subsequently described through the following examples without limiting the scope thereof.

Example 1: Preparation of Catalysts a, B and D (not According to the Invention) and C (According to the Invention)

The support used is an alumina with a pore volume of 0.7 ml/g and a high specific surface area (Al-1), provided by Axens. The characteristics of the catalysts thus prepared are given in table 1 below. The catalysts prepared differ by virtue of their active phase content and their ratios r1, r2 and r3.

A dry impregnation of this alumina is carried out using an aqueous solution of nickel nitrate, the volume of the aqueous solution being equal to the water uptake volume corresponding to the mass of support to be impregnated (total volume of water able to penetrate into the porosity). In the case in point, the amount of nickel nitrate impregnated corresponds to a nickel content (or content of oxide equivalent, NiO) of 4.7% by weight on the basis of the solid. After impregnation, the solid is left to mature at ambient temperature for 12 hours, then dried in a ventilated oven at 120° C. for 2 hours. Finally, the solid is calcined at 750° C. for two hours in a muffle furnace; this solid is subsequently denoted under the term AlNi.

The catalyst A is prepared by dry impregnation of the support Al-1 (without spinel). The catalysts B, C, D are prepared by dry impregnation of the AlNi support. The synthesis protocol consists in carrying out a dry impregnation using a solution of ammonium heptamolybdate and nickel nitrate, the volume of the aqueous solution that contains the metal precursors being equal to the water uptake volume corresponding to the mass of the support to be impregnated (total volume of water able to penetrate into the porosity). The concentrations of the precursors in the solution are adjusted so as to deposit the desired weight contents of metal oxides on the support. The solid is then left to mature at ambient temperature for 6 hours, then dried in a ventilated oven at 120° C. for 2 hours. Finally, the solid is calcined in a flow-through fixed-bed reactor at 450° C. for two hours under a stream of air with a flow rate of 1 l/g/h.

TABLE 1

| Catalyst | A | B | C | D |
|---|---|---|---|---|
| Support | Al-1 | AlNi | AlNi | AlNi |
| % by weight of $MoO_3$ | 7.0 | 3.5 | 7.0 | 7.0 |
| % by weight of NiO* | 6.6 | 6.6 | 6.6 | 3.3 |
| % by weight of M (of NiO) | 0 | 4.7 | 4.7 | 4.7 |
| Ratio r1 | 1.80 | 3.60 | 1.80 | 0.90 |
| Ratio r2 | 0 | 0.61 | 0.61 | 1.22 |
| Ratio r3 | 1.80 | 5.80 | 2.90 | 2.00 |

Characteristics of the catalysts A, B, C, D in oxide form
*except nickel involved in the AlNi support

Example 2: Evaluation of the Catalysts

The activity of catalysts A, B, C, D is evaluated by a test of selective hydrogenation of a mixture of model molecules, carried out in a 500 ml stirred autoclave reactor. 3 grams of catalyst are sulfided at atmospheric pressure in a sulfidation bench under an $H_2S/H_2$ mixture consisting of 15% by volume of $H_2S$ at 1 l/g·h of catalyst and at 350° C. for two hours. The catalyst thus sulfided is transferred to the reactor in the absence of air and then brought into contact with 250 ml of model feedstock under a total pressure of 1.5 MPa and a temperature of 130° C. The pressure is kept constant during the test by supplying hydrogen.

The feedstock used for the activity test has the following composition: 1000 ppm by weight of sulfur in the form of 3-methylthiophene, 500 ppm by weight of sulfur in the form of 2-propanethiol, 10% by weight of olefin in the form of 1-hexene, 1% by weight of diolefin in the form of isoprene, in n-heptane.

The time t=0 of the test corresponds to the bringing into contact of the catalyst and the feedstock. The duration of the test is set at 200 minutes and the gas chromatography analysis of the liquid effluent obtained makes it possible to evaluate the activities of the various catalysts in hydrogenation of isoprene (formation of methylbutenes), hydrogenation of 1-hexene (formation of n-hexane) and increasing of the molecular weight of the light mercaptans (conversion of 2-propanethiol).

The activity of the catalyst for each reaction is defined relative to the rate constant obtained for each reaction normalized per gram of catalyst. The rate constants are calculated assuming an order 1 for the reaction. The activities are normalized to 100% for catalyst C.

The selectivity of the catalyst with respect to the hydrogenation of isoprene is equal to the ratio of the activities of the catalyst in the hydrogenation of isoprene and of 1-hexene: A(isoprene)/A(1-hexene). The selectivity is normalized to 100% for catalyst C according to the invention.

The results obtained on the various catalysts are reported in table 2 below.

TABLE 2

| Catalyst | A | B | C | D |
|---|---|---|---|---|
| A(isoprene) | 79 | 67 | 100 | 95 |
| A(1-hexene) | 87 | 70 | 100 | 102 |
| A(isoprene)/A(1-hexene) | 91 | 96 | 100 | 93 |
| A(2-propanethiol) | 98 | 94 | 100 | 85 |

Performances of the catalysts in the model molecule test.

The catalyst C in accordance with the invention has, via a synergistic effect, a better activity and a better selectivity in terms of diolefin hydrogenation, while at the same time allowing a conversion of the light sulphur compounds that is at least as good, or even better, compared to the catalysts A, B and D not in accordance with the invention.

The invention claimed is:

1. A selective hydrogenation catalyst comprising an active phase containing at least one group VIB metal and at least one group VIII metal, and a porous support containing alumina and at least one spinel MAl$_2$O$_4$ where M is chosen from nickel and cobalt, wherein:
- a molar ratio (r1) between said at least one group VIII metal and said at least one group VIB metal of the active phase is 1.5 to 3.0 mol/mol;
- a molar ratio (r2) between M of the porous support and said at least one group VIII metal of the active phase is 0.5 to 0.7 mol/mol;
- a molar ratio (r3) between the sum of the contents of M and of the at least one group VIII metal relative to the content of the at least one group VIB metal is 2.2 to 3.0 mol/mol;
- a molar ratio (r4) between M of the porous support and said Group VIB metal of the active phase is 0.7 to 1.5 mol/mol;

- a content of the Group VIII metal of the active phase, measured as oxide, is 4 to 13% by weight relative to the total weight of the catalyst; and
- a content of the Group VIB metal of the active phase, measured as oxide, is 2 to 9% by weight relative to the total weight of the catalyst.

2. The catalyst as claimed in claim 1, wherein a molar ratio (r4) between M of the porous support and said at least one group VIB metal of the active phase is 0.8 to 1.5 mol/mol.

3. The catalyst as claimed in claim 1, wherein the content of M, measured in oxide form, is 0.5 to 10% by weight relative to the total weight of the catalyst.

4. The catalyst as claimed in claim 1, wherein the specific surface area of the catalyst is 110 to 190 m$^2$/g.

5. The catalyst as claimed in claim 1, wherein the degree of sulfidation of the metals of the active phase is at least equal to 50%.

6. The catalyst as claimed in claim 1, wherein the molar ratio (r3) is 2.3 to 3.0 mol/mol.

7. The catalyst as claimed in claim 1, wherein the group VIII metal is nickel and the group VIB metal is molybdenum.

8. The catalyst as claimed in claim 1, wherein M is nickel.

9. The catalyst as claimed in claim 1, wherein the molar ratio (r1) between said at least one group VIII metal and said at least one group VIB metal of the active phase is 1.6 to 3.0 mol/mol.

10. The catalyst as claimed in claim 1, wherein the molar ratio (r1) between said at least one group VIII metal and said at least one group VIB metal of the active phase is 1.8 mol/mol.

11. A process for preparing a catalyst as claimed in claim 1, comprising the following steps:
- a) the support is brought into contact with an aqueous or organic solution comprising at least one salt of metal M chosen from nickel and cobalt;
- b) the support impregnated on conclusion of step a) is left to mature at a temperature of less than 50° C. for a period of 0.5 hour to 24 hours;
- c) the matured impregnated support obtained on conclusion of step b) is dried at a temperature of 50° C. to 200° C. to obtain a solid;
- d) the solid obtained in step c) is calcined at a temperature of 500° C. to 1000° C. so as to obtain a spinel of type MAl$_2$O$_4$;
- e) the following substeps are carried out:
  - i) the solid obtained on conclusion of step d) is brought into contact with a solution comprising at least one precursor of the active phase of metal based on a group VIII metal and then the catalyst precursor is left to mature at a temperature of less than 50° C. for a period of 0.5 hour to 12 hours;
  - ii) the solid obtained on conclusion of step d) is brought into contact with a solution comprising at least one precursor of the active phase of metal based on a group VIB metal and then the catalyst precursor is left to mature at a temperature of less than 50° C. for a period of 0.5 hour to 12 hours;
  - steps i) and ii) being carried out separately, in any order, or at the same time;
- f) the catalyst precursor obtained in step e) is dried at a temperature of 50° C. to 200° C., for a period of 0.5 to 12 hours.

12. The process as claimed in claim 11, further comprising a step g) wherein the catalyst precursor obtained in step f) is calcined at a temperature of 200° C. to 550° C. for a period of 0.5 to 24 hours.

13. The process as claimed in claim 11, wherein in step f), the catalyst precursor obtained in step e) is dried at a temperature of 70° C. to 180° C.

14. The process as claimed in claim 11, wherein in step f), the catalyst precursor obtained in step e) is dried for a period of 0.5 to 5 hours.

15. A process for the selective hydrogenation of a gasoline comprising polyunsaturated compounds and light sulfur compounds, wherein the gasoline and hydrogen are brought into contact with a catalyst as claimed in claim 1, in sulfide form, at a temperature of 80° C. to 220° C., with a liquid space velocity of 1 h$^{-1}$ to 10 h$^{-1}$ and a pressure of 0.5 to 5

MPa, and with a molar ratio between hydrogen and the diolefins to be hydrogenated of greater than 1 and less than 10 mol/mol.

16. The process as claimed in claim 15, wherein said gasoline is fluid catalytic cracking (FCC) gasoline and has a boiling point of 0° C. to 280° C.

17. A process for the desulfurization of gasoline comprising sulfur compounds, comprising the following steps:

a) a step of selective hydrogenation implementing a process as claimed in claim 14;
  b) a step of separating the gasoline obtained in step a) into at least two fractions respectively comprising at least one light gasoline and one heavy gasoline;
  c) a step of hydrodesulfurization of the heavy gasoline separated in step b) on a catalyst making it possible to at least partially decompose the sulfur compounds into H$_2$.

\* \* \* \* \*